United States Patent
Sharma et al.

(10) Patent No.: US 12,352,970 B2
(45) Date of Patent: Jul. 8, 2025

(54) DIMMING CONTROL WITH DISPLAY-DIRECTED ACTIVATION LIGHT FOR AN OPTICAL ASSEMBLY

(71) Applicant: Meta Platforms Technologies, LLC, Menlo Park, CA (US)

(72) Inventors: Robin Sharma, Redmond, WA (US); Afsoon Jamali, Redmond, WA (US); Ming Lei, Bellevue, WA (US); Sho Nakahara, Bothell, WA (US); Nihar Ranjan Mohanty, Snoqualmie, WA (US); Karol Constantine Hatzilias, Kenmore, WA (US); Carl Chancy, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 524 days.

(21) Appl. No.: 17/717,669

(22) Filed: Apr. 11, 2022

(65) Prior Publication Data

US 2023/0168508 A1 Jun. 1, 2023

Related U.S. Application Data

(60) Provisional application No. 63/284,410, filed on Nov. 30, 2021.

(51) Int. Cl.
*G02B 27/01* (2006.01)
*G02F 1/01* (2006.01)
(Continued)

(52) U.S. Cl.
CPC ....... *G02B 27/0172* (2013.01); *G02F 1/0126* (2013.01); *G02F 1/157* (2013.01);
(Continued)

(58) Field of Classification Search
None
See application file for complete search history.

(56) References Cited

U.S. PATENT DOCUMENTS

| 10,254,454 B2 | 4/2019 | Klug et al. |
| 10,839,609 B2 | 11/2020 | Sears et al. |

(Continued)

FOREIGN PATENT DOCUMENTS

| CN | 205942162 U | 2/2017 |
| CN | 107645123 A * | 1/2018 |

(Continued)

OTHER PUBLICATIONS

International Search Report and Written Opinion for International Application No. PCT/US2022/051011, mailed Mar. 17, 2023, 13 pages.

(Continued)

*Primary Examiner* — Bao-Luan Q Le
*Assistant Examiner* — Danell L Owens
(74) *Attorney, Agent, or Firm* — Greenberg Traurig, LLP

(57) ABSTRACT

An optical assembly is configured to receive visible scene light at the backside of the optical assembly and to direct the visible scene light on an optical path toward the eyeward side. The optical assembly includes a dimming element disposed on the optical path, where the dimming element includes a photochromic material that is configured to darken in response to exposure to a range of light wavelengths. A display layer is disposed on the optical path between the eyeward side of the optical assembly and the dimming element. The display layer is configured to direct visible display light toward the eyeward side and also to direct activation light to the dimming element, where the (Continued)

activation light is within the range of light wavelengths to activate a darkening of the photochromic material to dim the visible scene light.

20 Claims, 16 Drawing Sheets

(51) Int. Cl.
  *G02F 1/157* (2006.01)
  *G02F 1/163* (2006.01)
(52) U.S. Cl.
  CPC ...... *G02F 1/163* (2013.01); *G02B 2027/0118* (2013.01); *G02B 2027/0178* (2013.01)

(56) References Cited

U.S. PATENT DOCUMENTS

| | | | |
|---|---|---|---|
| 11,029,521 | B2 | 6/2021 | Kalinowski et al. |
| 11,130,391 | B2 | 9/2021 | Choi et al. |
| 11,209,676 | B2 | 12/2021 | Leibovici et al. |
| 2015/0036204 | A1* | 2/2015 | Branda ............... G02F 1/1516 359/244 |
| 2017/0090194 | A1* | 3/2017 | Hayes ............... G02B 27/0101 |
| 2018/0095279 | A1 | 4/2018 | Bouchier et al. |
| 2018/0188538 | A1 | 7/2018 | Bell |
| 2018/0304727 | A1 | 10/2018 | Choi et al. |
| 2019/0163267 | A1 | 5/2019 | Hainzl et al. |
| 2019/0179409 | A1* | 6/2019 | Jones ............... G02B 27/0172 |
| 2020/0111259 | A1 | 4/2020 | Sears et al. |
| 2021/0274137 | A1 | 9/2021 | Goto et al. |
| 2021/0325696 | A1 | 10/2021 | Leibovici et al. |
| 2021/0325699 | A1 | 10/2021 | Leibovici et al. |
| 2022/0391608 | A1 | 12/2022 | Kurz et al. |

FOREIGN PATENT DOCUMENTS

| | | |
|---|---|---|
| CN | 107654006 B | 8/2020 |
| KR | 20210097983 A | 8/2021 |
| WO | 2013098707 A2 | 7/2013 |
| WO | 2013123592 A1 | 8/2013 |
| WO | 2017053040 A1 | 3/2017 |

OTHER PUBLICATIONS

International Search Report and Written Opinion for International Application No. PCT/US2022/051014, mailed Mar. 17, 2023, 13 pages.
International Search Report and Written Opinion for International Application No. PCT/US2022/051017, mailed Feb. 15, 2023, 11 pages.
Non-Final Office Action mailed Oct. 4, 2024 for U.S. Appl. No. 17/717,644, filed Apr. 11, 2022, 17 pages.
International Preliminary Report on Patentability for International Application No. PCT/US2022/051011, mailed Jun. 13, 2024, 11 pages.
International Preliminary Report on Patentability for International Application No. PCT/US2022/051014, mailed Jun. 13, 2024, 11 pages.
International Preliminary Report on Patentability for International Application No. PCT/US2022/051017, mailed Jun. 13, 2024, 9 pages.
1 Notice of Allowance mailed Jun. 4, 2024 for U.S. Appl. No. 17/709,423, filed Mar. 31, 2022, 13 pages.
Non-Final Office Action mailed Nov. 5, 2024 for U.S. Appl. No. 17/717,658, filed Apr. 11, 2022, 15 pages.
Final Office Action mailed Mar. 31, 2025 for U.S. Appl. No. 17/717,644, filed Apr. 11, 2022, 15 pages.

* cited by examiner

DIMMING CONTROL WITH DISPLAY-DIRECTED ACTIVATION LIGHT FOR AN OPTICAL ASSEMBLY

CROSS-REFERENCE TO RELATED APPLICATIONS

This application claims priority to U.S. provisional Application No. 63/284,410 filed Nov. 30, 2021, which is hereby incorporated by reference.

TECHNICAL FIELD

Aspects of the present disclosure relate generally to head mounted devices, and in particular but not exclusively, relate to the dimming of a photochromic material included in an optical assembly of the head mounted device.

BACKGROUND INFORMATION

A smart device is an electronic device that typically communicates with other devices or networks. In some situations the smart device may be configured to operate interactively with a user. A smart device may be designed to support a variety of form factors, such as a head mounted device, a head mounted display (HMD), or a smart display, just to name a few.

Smart devices may include one or more electronic components for use in a variety of applications, such as gaming, aviation, engineering, medicine, entertainment, video/audio chat, activity tracking, and so on. In some examples, a smart device, such as a head-mounted device or HMD, may include a display that can present data, information, images, or other virtual graphics while simultaneously allowing the user to view the real world.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an optical assembly and a head-mounted display with dimming control are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.4 µm. Violet light may include light having a wavelength in the range of approximately 380-450 nm.

Figure 1A:
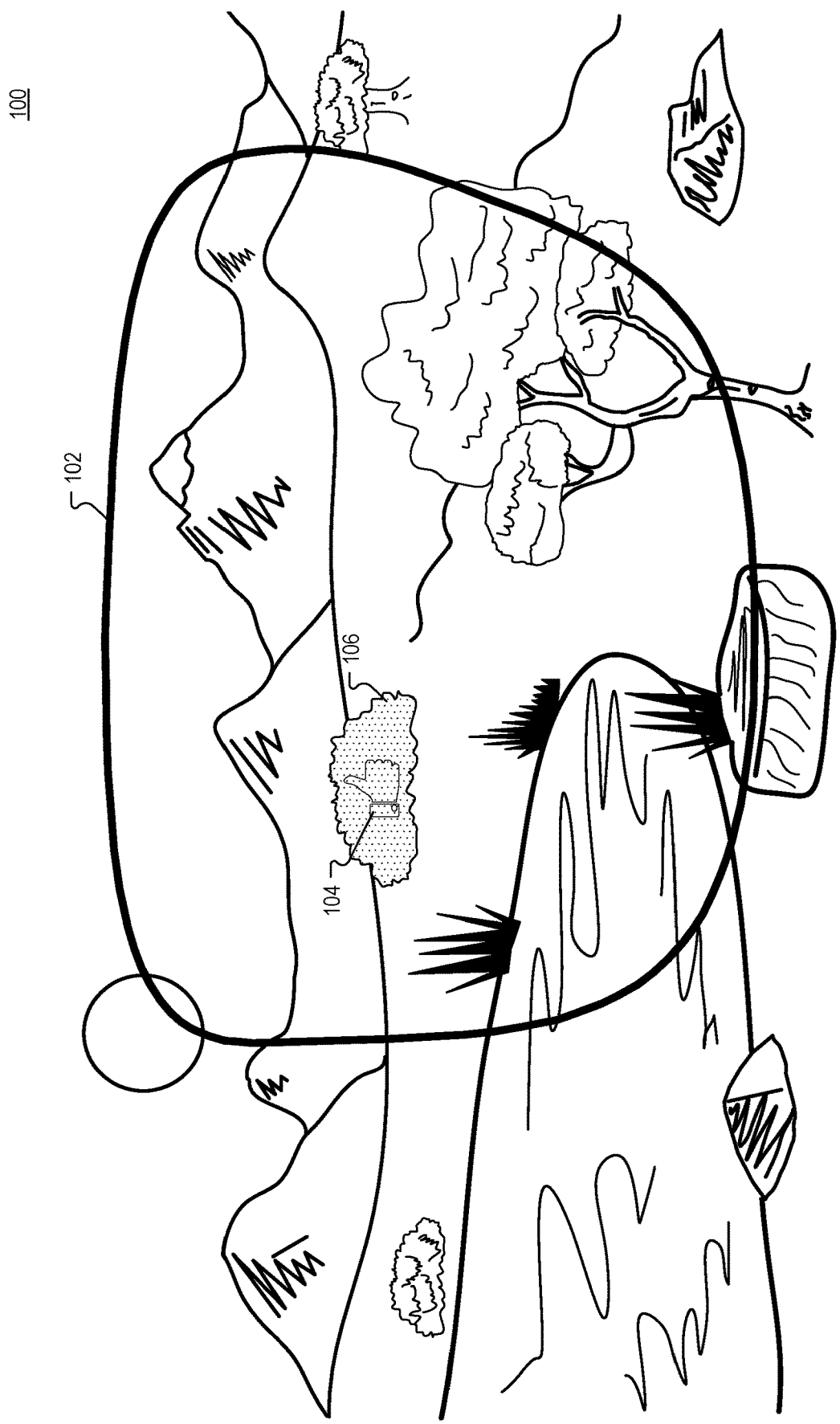
FIGS. 1A, 1B, and 1C illustrate a user's view through a near-eye optical assembly of a head-mounted device, in accordance with aspects of the disclosure.

As mentioned above, a head-mounted device may include a display that is configured to present data, information, images, or other virtual graphics while simultaneously allowing the user to view the real world. However, the virtual graphics may be difficult for the user to view if the environment is too bright, if there is insufficient contrast between the virtual graphics and the user's current view of the real world, if a color of the virtual graphic matches the color of the real world behind the virtual graphic, or some combination thereof. By way of example, FIG. 1A illustrates a user's view of a real-world scene 100 through an optical assembly 102 of a head-mounted device. As shown in FIG. 1A, the optical assembly 102 allows the user to view the real-world scene 100 while simultaneously presenting a virtual graphic 104 to the user. In the illustrated example, virtual graphic 104 is an icon, but in other examples, the virtual graphic 104 may include text, a picture, video, or other visual information that is generated by the optical assembly 102 for presentation to the user. However, as shown in FIG. 1A the virtual graphic 104 is positioned on the optical assembly 102 at the same location as the user's view of a real-world object 106 (e.g., illustrated as a shrub/bush in FIG. 1A). In some examples, the real-world object 106 may interfere with the user's visibility of the virtual graphic 104. That is, the real-world object 106 may be the same or similar color as the virtual graphic 104, and/or the contrast between the real-world object 106 and the virtual graphic 104 may be too low. Thus, in some conditions, the virtual graphic 104 may be difficult for the user to discern when it is co-located with the user's view of the real-world object 106.

Figure 1B:
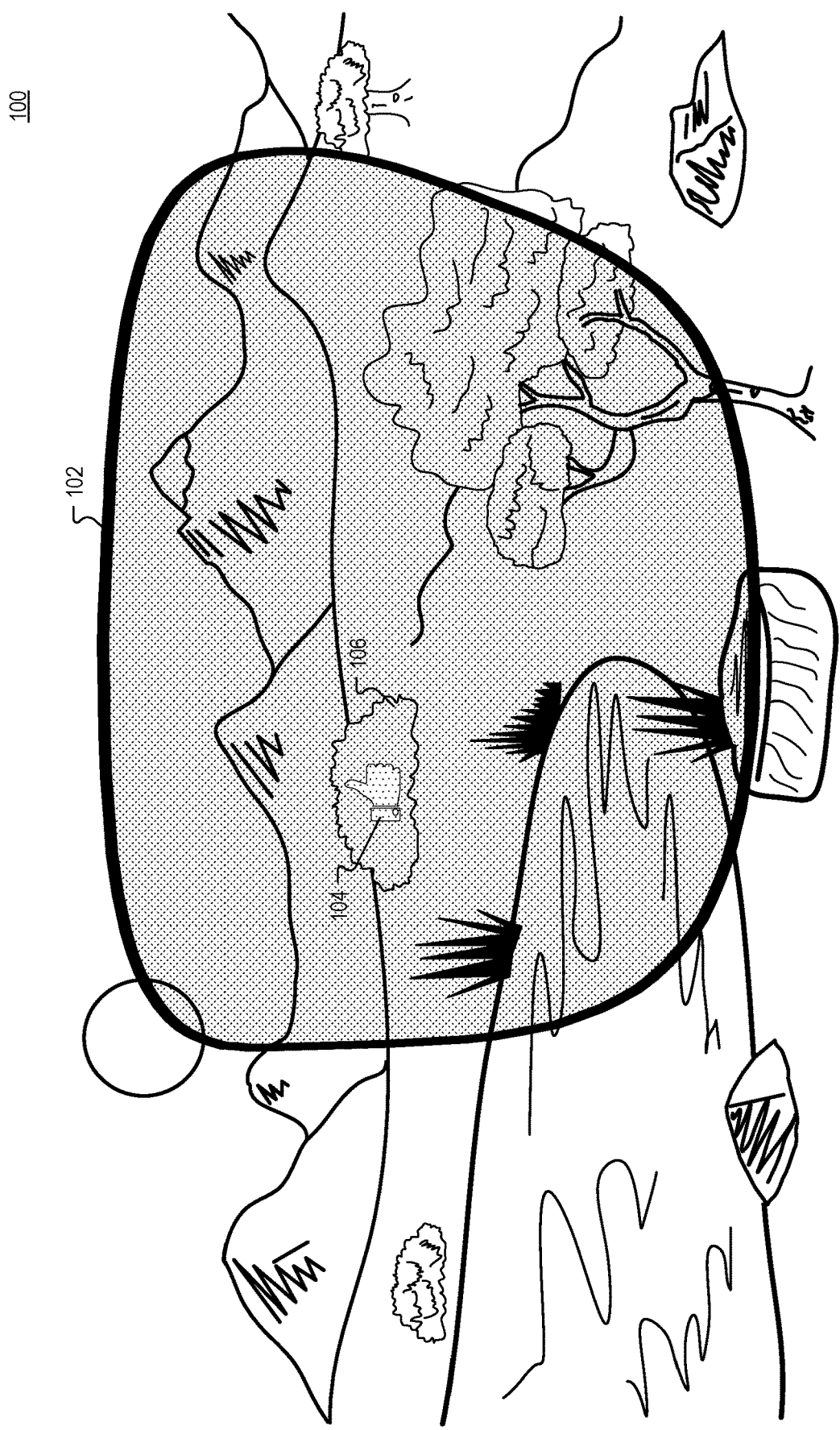

Accordingly, aspects of the present disclosure provide for the dimming of light received from the real-world scene 100 to increase the visibility of the virtual graphic 104. For example, FIG. 1B illustrates the darkening of an entire field of view that is provided by the optical assembly 102. In some examples, dimming the entire field of view may be referred to as global dimming. As shown, the dimming provided by the optical assembly 102 reduces or occludes light received from the real-world scene 100 but does not occlude or dim the display light used to generate the virtual graphic 104. Thus, while FIG. 1B illustrates the virtual graphic 104 as being unchanged with respect to the view shown in FIG. 1A, the virtual graphic 104 may have increased visibility due to the darkening of the real-world object 106 provided by the global dimming of the optical assembly 102.

Figure 1C:
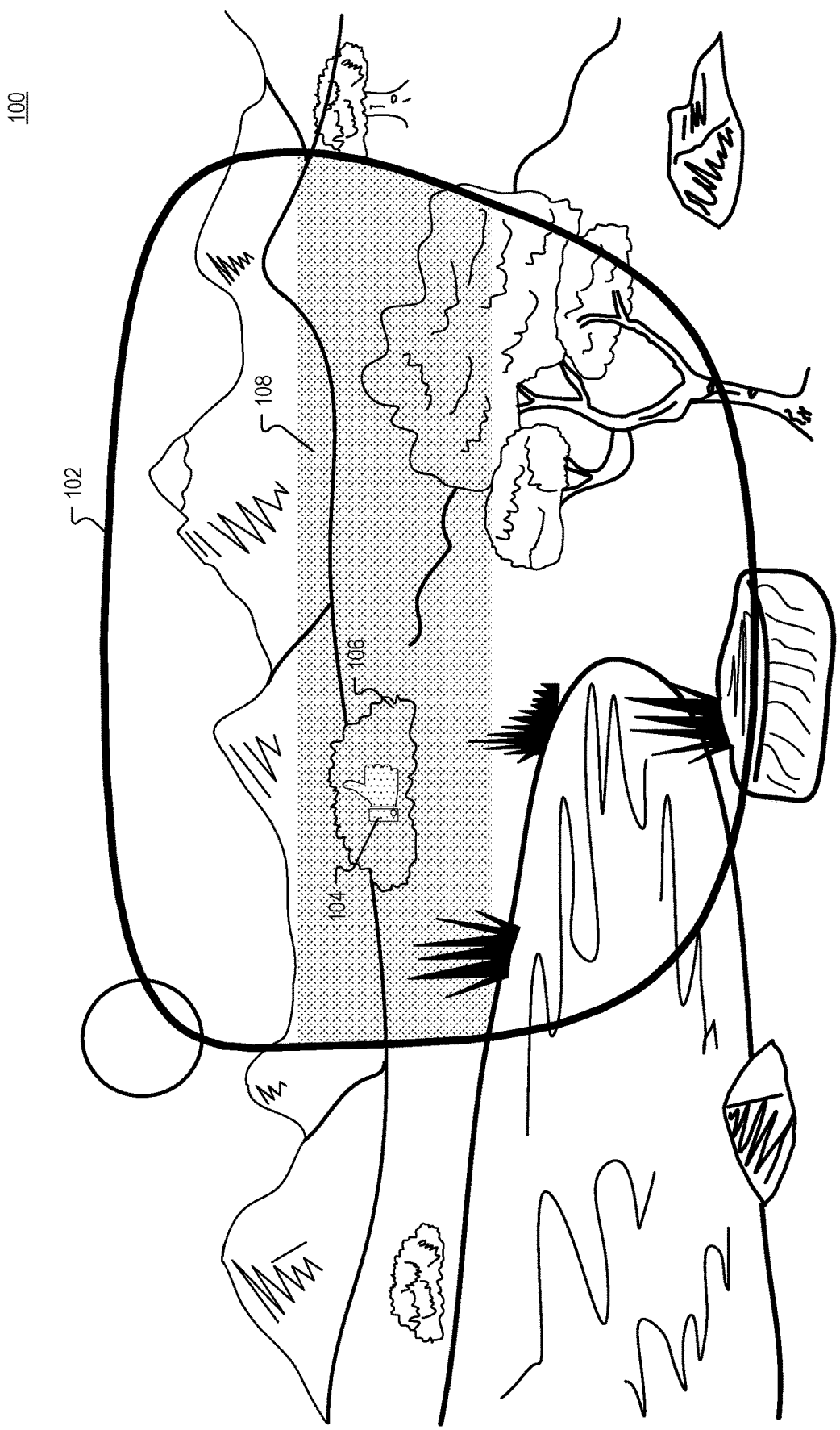

FIG. 1C illustrates an example of optical assembly 102 darkening a region 108, where region 108 is less than the entire field of view provided by the optical assembly 102. In some examples, dimming only a portion of the field-of-view provided by the optical assembly 102 (e.g., less than the entire field-of-view) is referred to as local dimming.

The dimming provided by the optical assembly 102, as shown in FIGS. 1B and 1C, may be provided by a dimming element included in the optical assembly 102. The dimming element may include a photochromic material that darkens in response to exposure to a range of light wavelengths. In some aspects, when activated, the photochromic material may undergo a reversible photochemical reaction that results in a change in its visible light absorption, in strength and/or wavelength.

The darkening of the dimming element is activated by way of one or more illuminators that are configured to selectively emit an activation light that is within the range of wavelengths that trigger the darkening of the photochromic material. In some embodiments, the activation light is directed to the dimming element by the display layer of the optical assembly. That is, the display layer not only directs display light (e.g., virtual graphic 104) to the user, but also directs activation light to a dimming element. In some examples, the display layer directs the activation light to the dimming element by reflection. For instance, the illuminators may be positioned to emit the activation light towards a surface of the display layer, which then reflects the activation light towards the dimming element. In other examples, the display layer directs the activation light to the dimming element by way of one or more illuminators that are disposed on a surface of the display layer, itself. These and other aspects will be discussed in more detail below.

Figure 2:
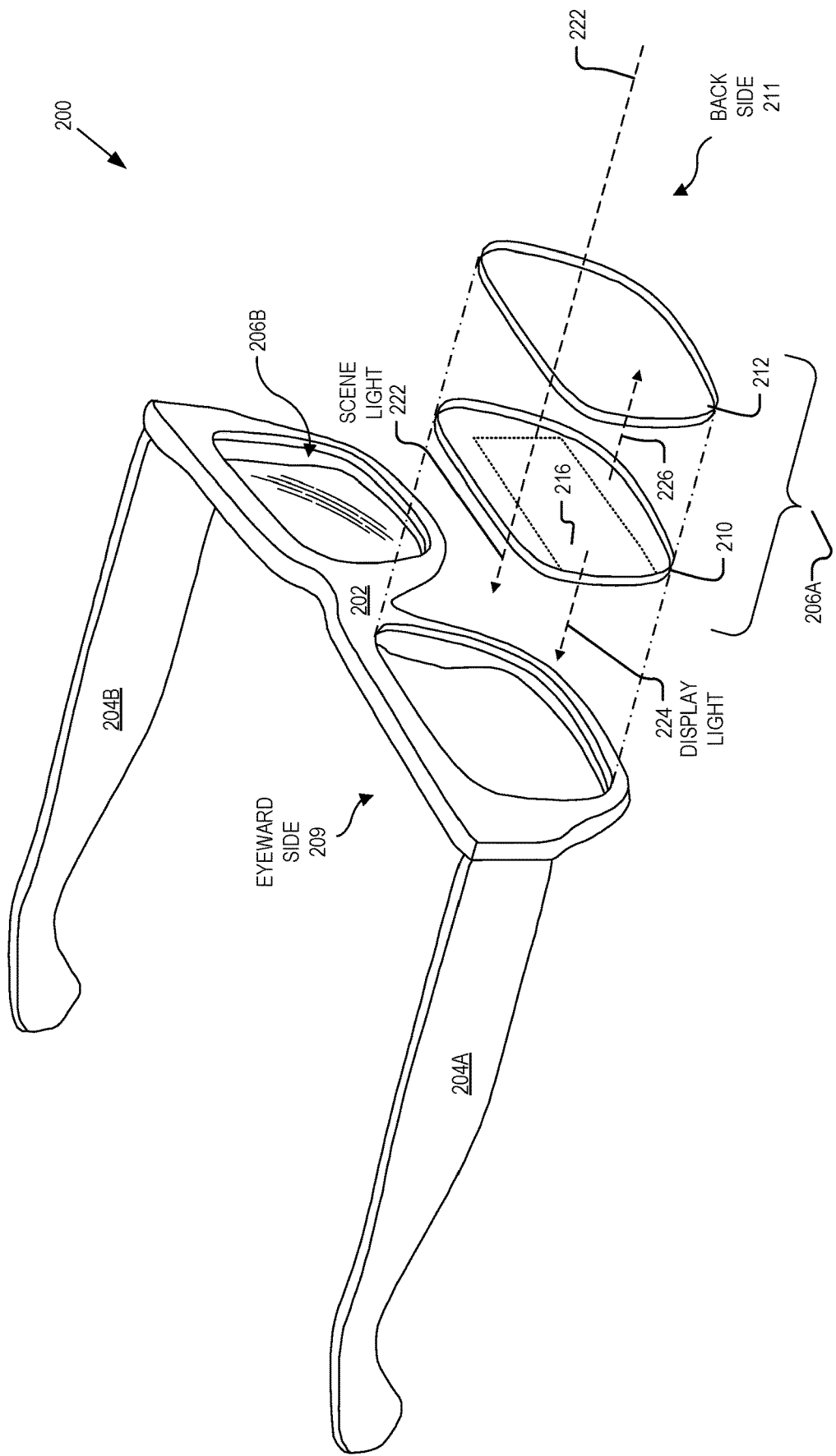
FIG. 2 illustrates a head-mounted device, in accordance with aspects of the disclosure.

FIG. 2 illustrates an example head-mounted device 200, in accordance with aspects of the present disclosure. A head-mounted device, such as head-mounted device 200, is one type of smart device, typically worn on the head of a user to provide artificial reality content to a user. Artificial reality is a form of reality that has been adjusted in some manner before presentation to the user, which may include, e.g., virtual reality (VR), augmented reality (AR), mixed reality (MR), hybrid reality, or some combination and/or derivative thereof.

The illustrated example of head-mounted device 200 is shown as including a frame 202, temple arms 204A and 204B, and a near-eye optical assembly 206A and a near-eye optical assembly 206B. FIG. 2 also illustrates an exploded view of an example of near-eye optical assembly 206A. Near-eye optical assembly 206A is shown as including a display layer 210 and a dimming element 212.

As shown in FIG. 2, frame 202 is coupled to temple arms 204A and 204B for securing the head-mounted device 200 to the head of a user. Example head-mounted device 200 may also include supporting hardware incorporated into the frame 202 and/or temple arms 204A and 204B. The hardware of head-mounted device 200 may include any of processing logic, wired and/or wireless data interfaces for sending and receiving data, graphic processors, and one or more memories for storing data and computer-executable instructions. In one example, head-mounted device 200 may be configured to receive wired power and/or may be configured to be powered by one or more batteries. In addition, head-mounted device 200 may be configured to receive wired and/or wireless data including video data.

FIG. 2 illustrates near-eye optical assemblies 206A and 206B that are configured to be mounted to the frame 202. The frame 202 may house the near-eye optical assemblies 206A and 206B by surrounding at least a portion of a periphery of the near-eye optical assemblies 206A and 206B. The near-eye optical assembly 206A is configured to receive visible scene light 222 at a backside 211 of the near-eye optical assembly 206A and to direct the visible scene light 222 on an optical path towards the eyeward side 209. In some examples, near-eye optical assembly 206A may appear transparent to the user to facilitate augmented reality or mixed reality such that the user can view visible scene light 222 from the environment while also receiving display light 224 directed to their eye(s) by way of display layer 210. In further examples, some or all of the near-eye optical assemblies 206A and 206B may be incorporated into a virtual reality headset where the transparent nature of the near-eye optical assemblies 206A and 206B allows the user to view an electronic display (e.g., a liquid crystal display (LCD), an organic light emitting diode (OLED) display, a micro-LED display, etc.) incorporated in the virtual reality headset.

As shown in FIG. 2, the display layer 210 is disposed on the optical path of the near-eye optical assembly 206A, between the eyeward side 209 and the backside 211 of the near-eye optical assembly 206A. In particular, the display layer 210 is disposed between the eyeward side 209 and the dimming element 212. In some examples, display layer 210 may include a waveguide 216 that is configured to direct display light 224 to present one or more virtual graphics to an eye of a user of head-mounted device 200. In some aspects, waveguide 216 is configured to direct display light 224 that is generated by an electronic display to the eye of the user. In some implementations, at least a portion of the electronic display is included in the frame 202 of the head-mounted device 200. The electronic display may include an LCD, an organic light emitting diode (OLED) display, micro-LED display, pico-projector, or liquid crystal on silicon (LCOS) display for generating the display light 224.

FIG. 2 illustrates the dimming element 212 as being disposed on the optical path of the near-eye optical assembly 206A, between the eyeward side 209 and the backside 211. In particular, the dimming element 212 is shown as being disposed between the display layer 210 and the backside 211. In some examples, the dimming element 212 includes a photochromic material that is configured to darken in response to exposure to a range of light wavelengths. For example, the photochromic material may be configured to undergo a reversible photochemical reaction in response to exposure to non-visible light, such as infrared (IR) and/or ultraviolet (UV) light. In other examples, the photochromic material may be activated to darken in response to exposure to violet light having wavelengths in the range of 400 to 440 nm. In some aspects, the photochromic material is a film or dye that is applied to a transparent material, such as a plastic or glass lens. In other aspects, the photochromic material is provided by a photochromic compound that is suspended within a transparent substrate, such as a plastic or glass lens.

In some aspects, the photochromic material of the dimming element 212 is distributed across the entire field-of-view provided by the near-eye optical assembly 206A (e.g., across the entire dimming element 212). In other aspects, the photochromic material may be provided in only certain portions of the field-of-view (e.g., upper half of the dimming element 212).

FIG. 2 also shows an activation light 226 that is directed to the dimming element 212 by the display layer 210. The activation light 226 may be generated by one or more illuminators 214 (not shown in FIG. 2) that are configured to selectively emit the activation light 226 that is within the range of light wavelengths that activate the photochromic material of the dimming element 212 (e.g., non-visible light, IR light, UV light, violet light, etc.). As will be discussed in more detail below, the display layer 210 may direct the activation light 226 to the dimming element 212 by receiving the activation light 226 at a surface of the display layer 210 and then reflecting the activation light 226 towards the dimming element. In other examples, the display layer 210 may direct activation light 226 towards the dimming element 212 by one or more illuminators that are disposed on or within the display layer 210, itself.

In some examples, the display layer 210 and/or the dimming element 212 may have a curvature for focusing light (e.g., scene light 222) to the eye of the user. In some aspects, the display layer 210 and/or the dimming element 212 may have a thickness and/or curvature that corresponds to the specifications of a user. In other words, the display layer 210 or the dimming element 212 may be a prescription lens.

As mentioned above, the illuminators that generate the activation light 226 are configured to emit the activation light 226 that is then directed by the display layer 210 to the dimming element 212 to activate a darkening of the photochromic material. In some examples, enabling of the illuminators is dynamically determined by a computing device of the head-mounted device 200. For instance, the head-mounted device 200 may include a computing device that determines whether the visible scene light 222 will interfere with the visibility of a virtual graphic generated by the visible display light 224. The computing device may make such a determination based on a comparison of a color of the visible scene light 222 and/or by determining a contrast between the visible scene light 222 and the visible display light 224. If the color of the visible scene light 222 is the same or similar to the color of the visible display light 224, and/or if the contrast between the visible scene light 222 and the visible display light 224 is lower than a low-contrast threshold, then the computing device may enable the illuminators to emit the activation light 226 to darken the photochromic material of dimming element 212.

In some aspects, the photochemical reaction of the dimming element 212 that is induced by the activation light 226 may be reversible. In one embodiment, disabling the illuminators, such that they no longer emit the activation light 226, allows the photochromic material of the dimming element 212 to naturally revert to its previous non-darkened state. In other embodiments, the head-mounted device 200 may be configured to actively restore the dimming element 212 to its non-darkened state (un-dimmed) by directing a bleaching light to the dimming element 212. In some examples, the bleaching light may be emitted by the same illuminators or by other light sources (not explicitly shown) that are included in the head-mounted device 200. The bleaching light may be light having a wavelength that increases the rate at which the photochromic material is restored to its non-darkened state, such as visible light, UV light, and/or IR light.

Figure 3B:
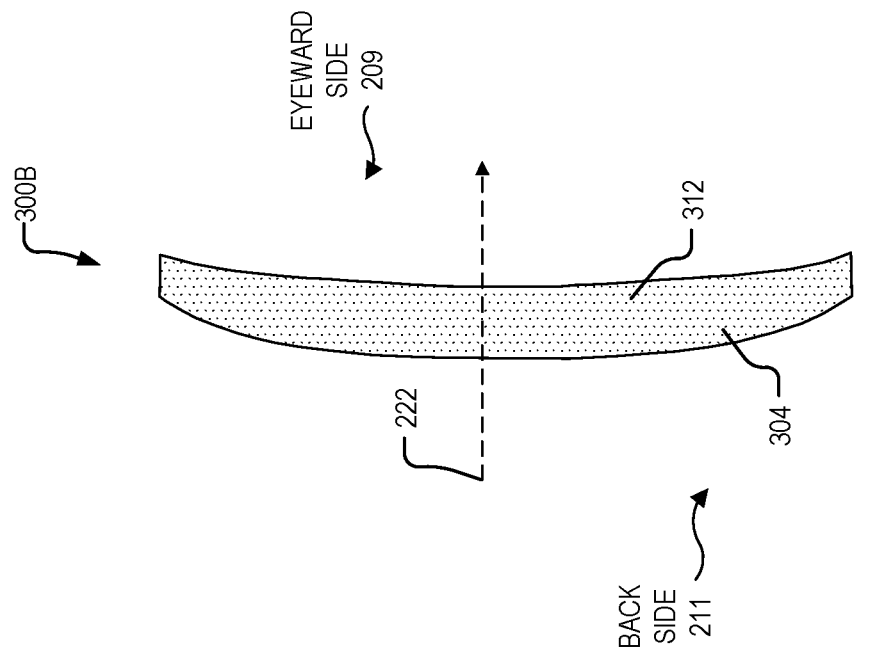
FIG. 3B illustrates a dimming element having an embedded dye of photochromic material, in accordance with aspects of the disclosure.
Figure 3A:
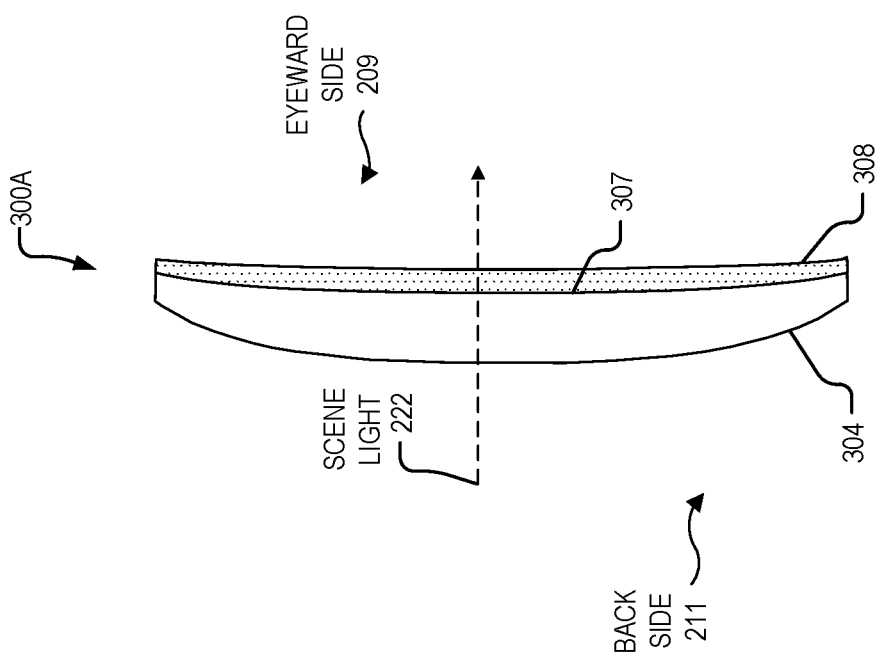
FIG. 3A illustrates a dimming element having a coating of photochromic material, in accordance with aspects of the disclosure.

FIG. 3A illustrates an example dimming element 300A, in accordance with aspects of the disclosure. Dimming element 300A is one possible implementation of dimming element 212 of FIG. 2. Dimming element 300A is shown as including a lens 304 and a coating 308. As shown in FIG. 3A, coating 308 is disposed on an optical surface 307 of the lens 304. In some aspects, the coating 308 is a coating of photochromic material that is applied to the optical surface 307.

FIG. 3B illustrates an example dimming element 300B, in accordance with aspects of the disclosure. Dimming element 300B is one possible implementation of dimming element 212 of FIG. 2. Dimming element 300B is shown as including lens 304 and a dye 312. As shown in FIG. 3B, dye 312 is embedded within the lens 304. In some aspects, the dye 312 includes photochromic material that is distributed within the lens 304, such as during molding or casting.

Figure 4A:
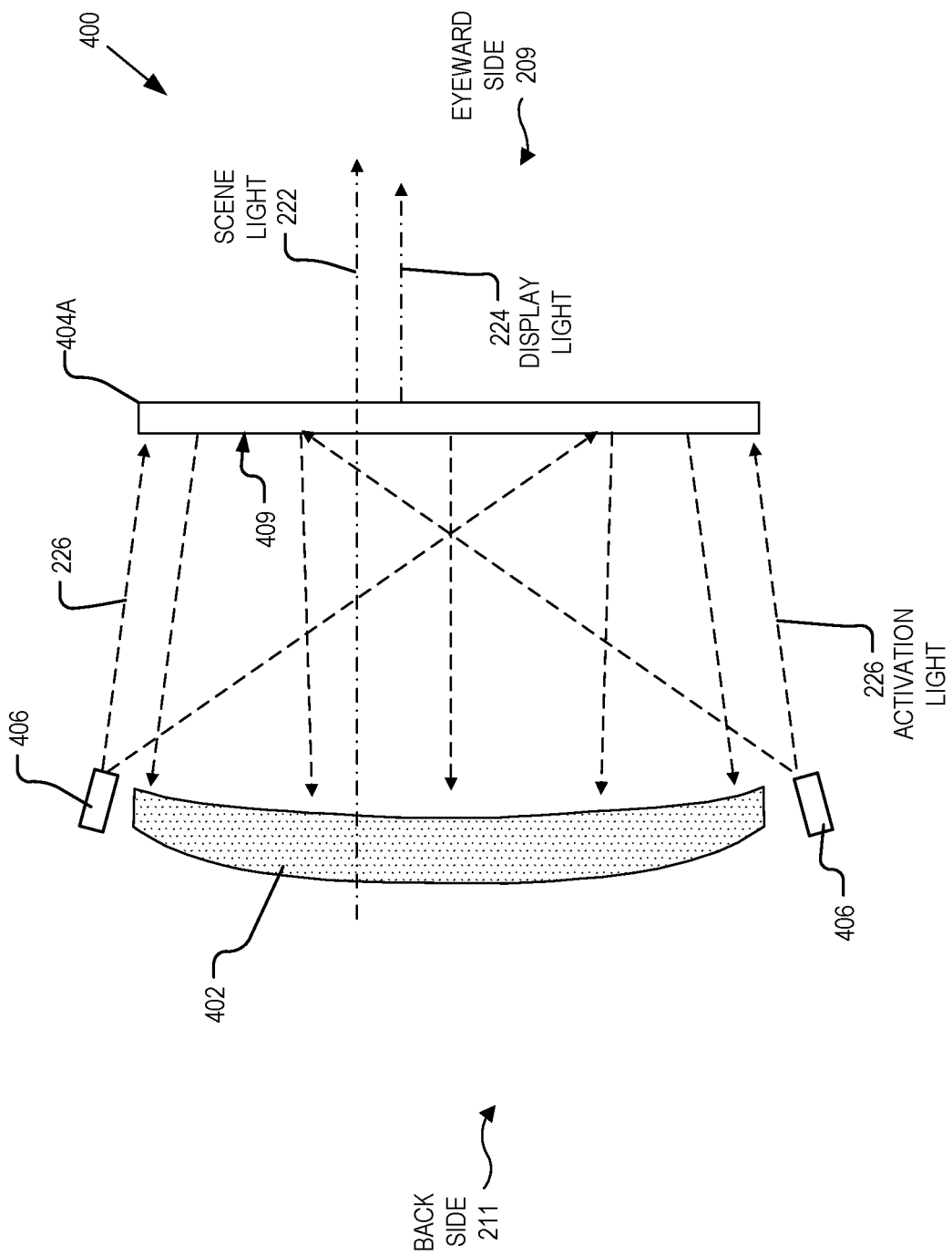
FIG. 4A illustrates an optical assembly that includes a display layer configured to direct activation light to a dimming element by reflection, in accordance with aspects of the disclosure.

FIG. 4A illustrates an optical assembly 400 that includes a display layer 404A that is configured to direct activation light 226 to dimming element 402 by reflection, in accordance with aspects of the disclosure. Optical assembly 400 is one possible implementation of the optical assembly 206A of FIG. 2. The illustrated example of optical assembly 400 is shown as including dimming element 402 and display layer 404A. Also shown in FIG. 4A are one or more illuminators 406. In some aspects each of the illuminators 406 may be a light source that generates the activation light 226, such as a light emitting diode, a micro light emitting diode (micro-LED), an edge emitting LED, a vertical cavity surface emitting laser (VCSEL) diode, or a Superluminescent diode (SLED). In some examples, the illuminators 406 may be mounted to or incorporated within a frame of a head-mounted device (e.g., frame 202 of FIG. 2). Although FIG. 4A illustrates optical assembly 400 as including two illuminators 406, optical assembly 400 may include any number of illuminators 406, including one or more.

As shown in FIG. 4A, the illuminators 406 are disposed facing the display layer 404A such that the emitted activation light 226 is received at the surface 409 of the display layer 404A. The surface 409 of the display layer 404A is configured to then reflect the activation light 226 towards the dimming element 402 to darken the photochromic material and dim the scene light 222. In some examples, the display layer 404A is configured to absorb at least some of the activation light 226 to inhibit or prevent the transmission of the activation light 226 to the eyeward side 209 of optical assembly 400. By way of example, the display layer 404A may include material that absorbs light in the range of wavelengths corresponding to the activation light 226. In some implementations, the display layer 404A may include a material that absorbs UV radiation and does not transmit light below 400 nm. In one aspect, the display layer 404A includes silicon carbide (SiC).

In some aspects, surface 409 is configured to reflect and scatter the activation light 226. That is, surface 409 may be a Lambertian, or quasi Lambertian surface that scatters light within the range of wavelengths corresponding to the activation light 226 (e.g., UV light). The scattering of the activation light 226 towards the dimming element 402 may be configured to generate a uniform or near uniform haze of activation light 226 to increase the uniformity of the illumination of the dimming element 402 to trigger an evenly distributed darkening of the photochromic material.

Figure 4B:
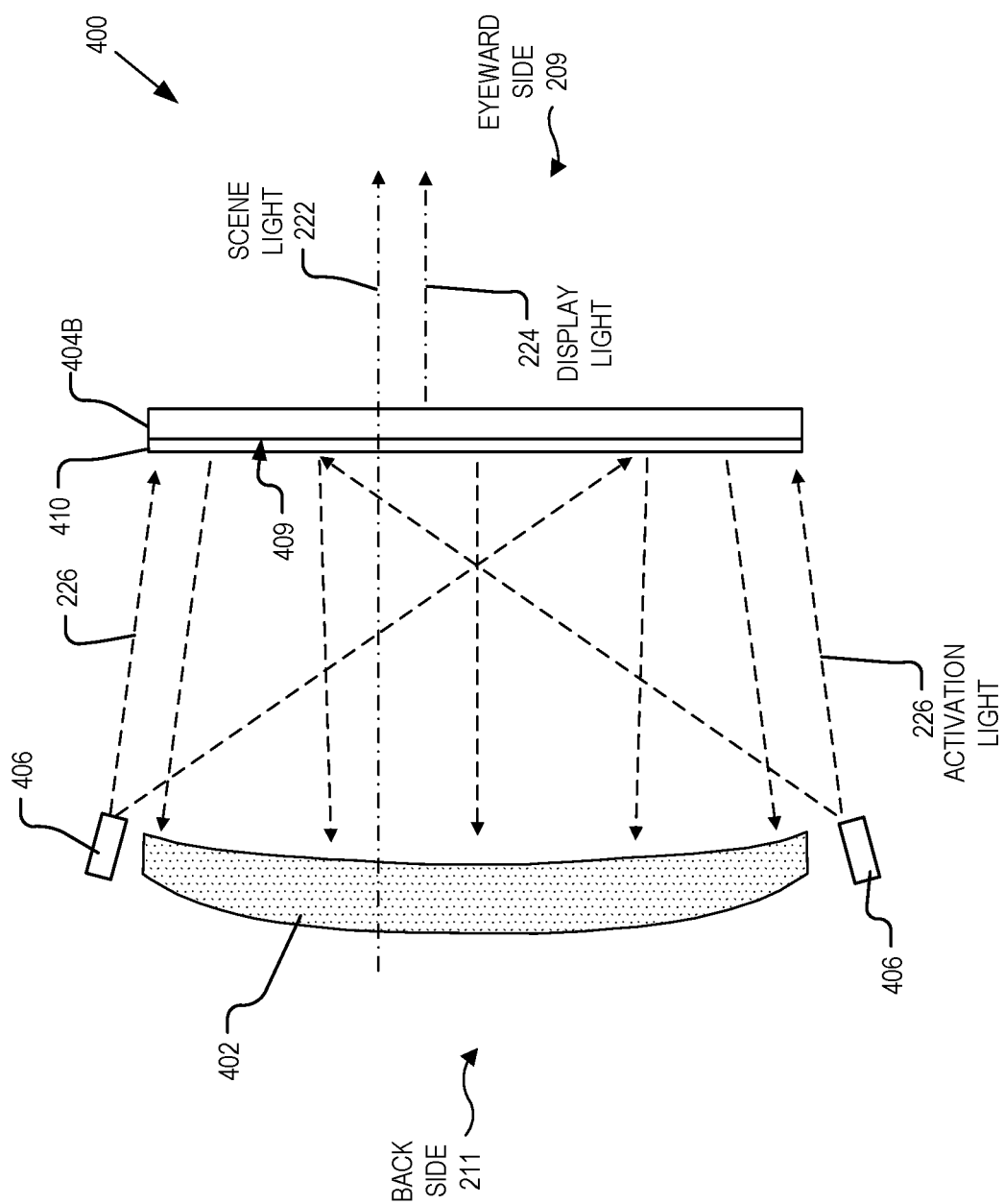
FIG. 4B illustrates an optical assembly that includes a display layer having a reflective layer, in accordance with aspects of the disclosure.

FIG. 4B illustrates an example display layer 404B that includes a reflective layer 410, in accordance with aspects of the disclosure. As shown in FIG. 4B, the reflective layer 410 is disposed on surface 409 and is configured to reflect the activation light 226 towards the dimming element 402. In some examples, reflective layer 410 is reflective to the activation light 226 and transmissive to the scene light 222. Reflective layer 410 may also be configured to scatter the activation light 226 towards the dimming element 402 to increase the uniformity of the illumination of the dimming element 402.

Figure 4C:
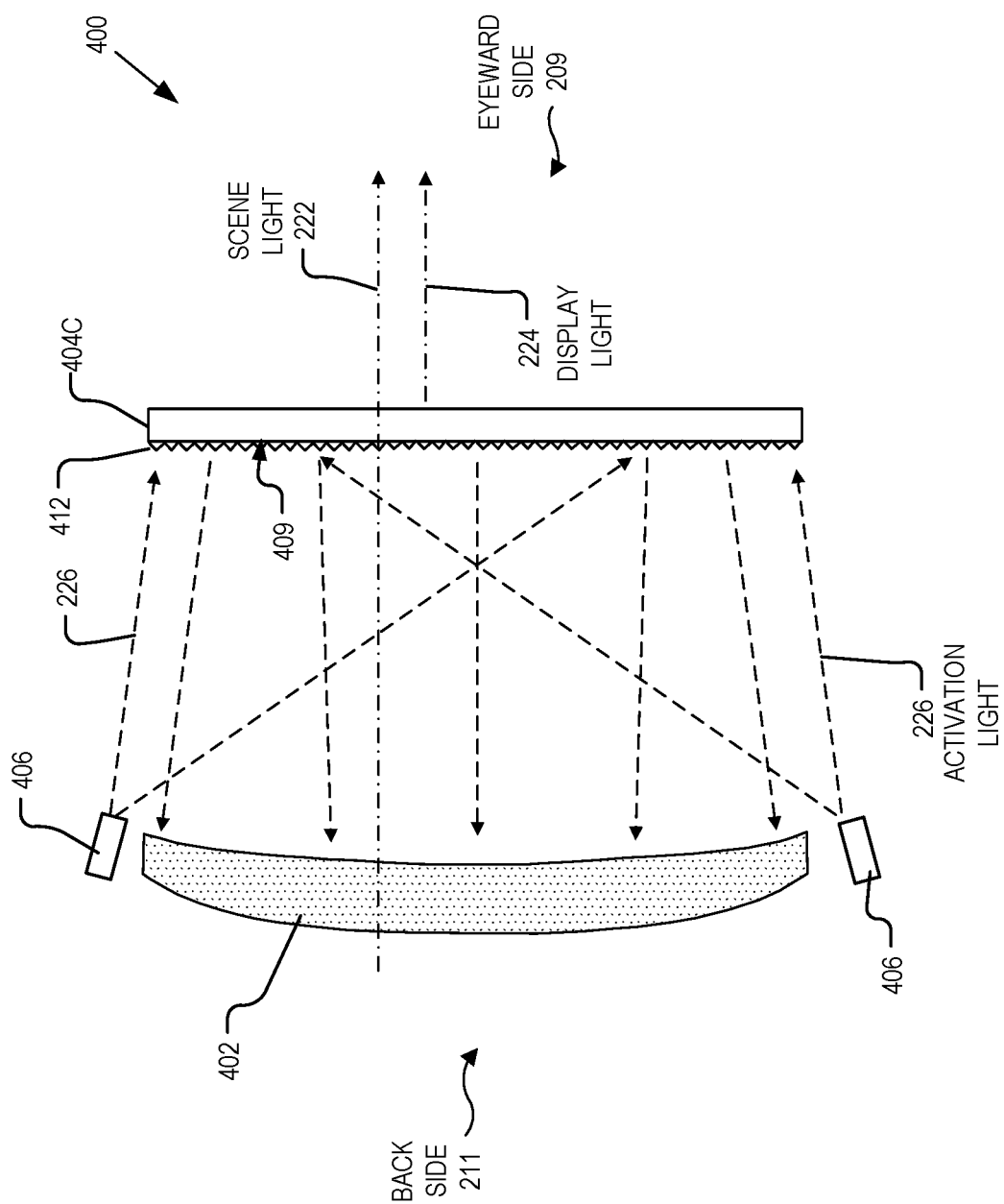
FIG. 4C illustrates an optical assembly that includes a display layer having several microstructures configured to scatter activation light towards a dimming element, in accordance with aspects of the disclosure.

FIG. 4C illustrates a display layer 404C that includes several microstructures 412 configured to scatter activation light towards dimming element 402, in accordance with aspects of the disclosure. FIG. 4C shows the microstructures as being disposed on the surface 409 of the display layer 404C. The microstructures 412 may be patterned on the surface 409 of the display layer 404C in a two-dimensional array of structures that are configured to reflect and scatter the activation light 226. In some examples, the microstructures 412 have a spatial frequency in a range corresponding to the range of wavelengths of the activation light 226. In addition, the spatial frequency of the microstructures 412 may be small enough to scatter the activation light 226 (e.g., UV), but do not interact with longer wavelengths (e.g., visible scene light 222).

Figure 5:
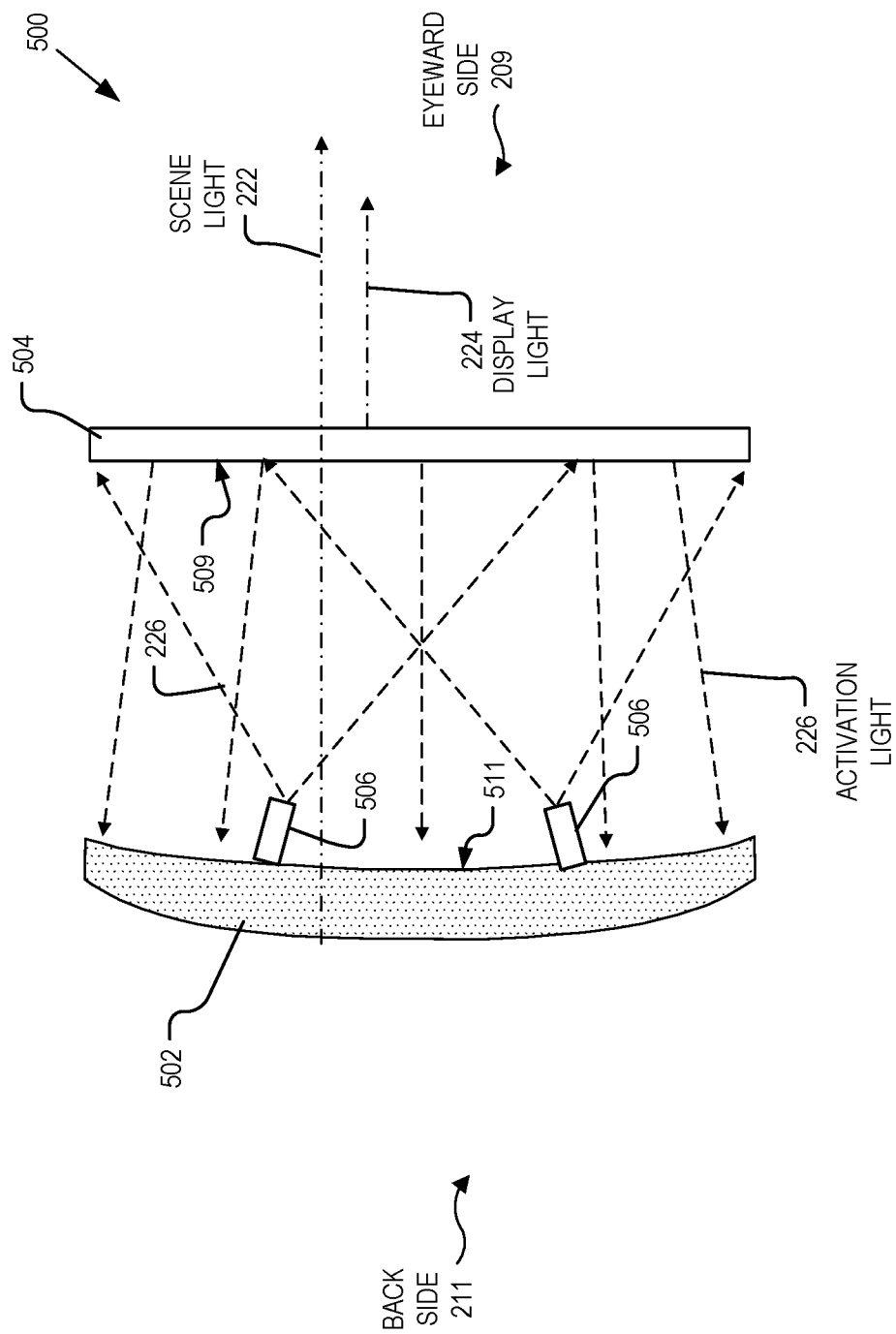
FIG. 5 illustrates another example optical assembly that includes a display layer configured to direct activation light to a dimming element by reflection, in accordance with aspects of the disclosure.

FIG. 5 illustrates an example optical assembly 500 that includes a display layer 504 configured to direct activation light 226 to a dimming element 502 by reflection, in accordance with aspects of the disclosure. Optical assembly 500 is one possible implementation of the optical assembly 206A of FIG. 2. The illustrated example of optical assembly 500 is shown as including dimming element 502 and display layer 504. Also shown in FIG. 5 are one or more illuminators 506. In some aspects each of the illuminators 506 may be a light source that generates the activation light 226, such as a light emitting diode, a micro light emitting diode (micro-LED), a vertical cavity surface emitting laser (VCSEL) diode, or a Superluminescent diode (SLED). As shown in FIG. 5, the illuminators 506 may be disposed on a surface 511 of the dimming element 502, facing the display layer 504. In other examples, the illuminators 506 may be encapsulated within the lens material of the dimming element 502. Although FIG. 5 illustrates optical assembly 500 as including two illuminators 506, optical assembly 500 may include any number of illuminators 506, including one or more. In addition, FIG. 5 illustrates illuminators 506 being disposed within a field of view of the dimming element 502 (i.e., within a field of view of the user of the optical assembly 500). While illuminators 506 may introduce minor occlusions into the optical assembly 500 within a field of view of a wearer/user, the illuminators 506, as well as their corresponding electrical routing may be so small as to be unnoticeable or insignificant to a user of the optical assembly 500. Additionally, any occlusion from illuminators 506 will be placed so close to the eye as to be unfocusable by the human eye and therefore assist in the illuminators 506 being not noticeable or insignificant. In some implementations, each illuminator 506 has a footprint (or size) that is less than about 200×200 microns.

As shown in FIG. 5, the illuminators 506 are disposed facing the display layer 504 such that the emitted activation light 226 is received at the surface 509 of the display layer 504. The surface 509 of the display layer 504 is configured to then reflect and scatter the activation light 226 towards the dimming element 502 to darken the photochromic material and dim the scene light 222.

Figure 6:
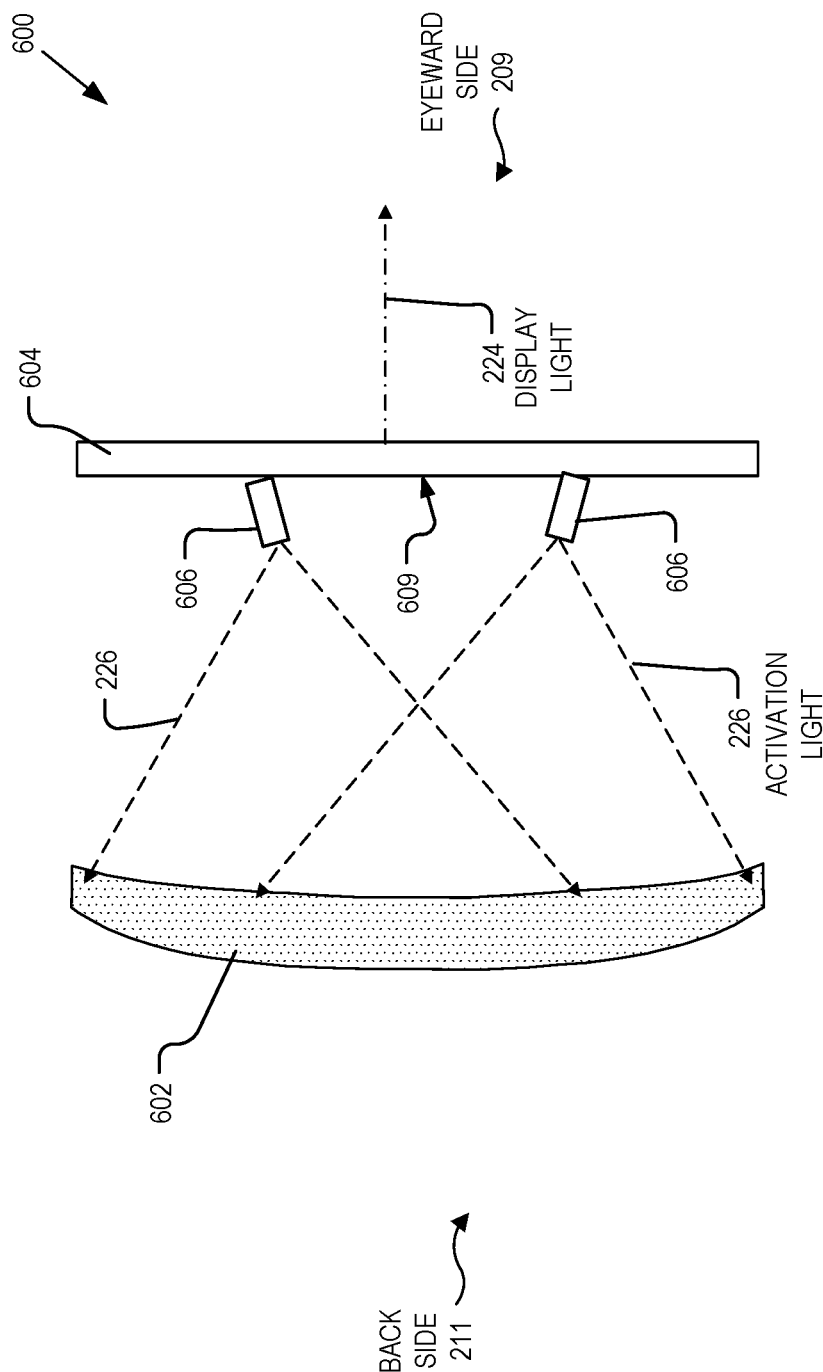
FIG. 6 illustrates an optical assembly that includes a display layer configured to direct activation light to a dimming element from illuminators located on a surface of the display layer, in accordance with aspects of the disclosure.

FIG. 6 illustrates an optical assembly 600 that includes a display layer 604 configured to direct activation light 226 to a dimming element 602 from illuminators 606 located on a surface 609 of the display layer 604, in accordance with aspects of the disclosure. Optical assembly 600 is one possible implementation of the optical assembly 206A of FIG. 2. The illustrated example of optical assembly 600 is shown as including dimming element 602 and display layer 604. Also shown in FIG. 6 are one or more illuminators 606. In some aspects each of the illuminators 606 may be a light source that generates the activation light 226, such as a light emitting diode, a micro light emitting diode (micro-LED), a vertical cavity surface emitting laser (VCSEL) diode, or a Superluminescent diode (SLED). As shown in FIG. 6, the illuminators 606 may be disposed on a surface 609 of the display layer 604, facing the dimming element 602. In other examples, the illuminators 606 may be encapsulated within the lens material of the display layer 604. Although FIG. 6 illustrates optical assembly 600 as including two illuminators 606, optical assembly 600 may include any number of illuminators 606, including one or more. In addition, FIG. 6 illustrates illuminators 606 being disposed within a field of view of the display layer 604 (i.e., within a field of view of the user of the optical assembly 600). While illuminators 606 may introduce minor occlusions into the optical assembly 600 within a field of view of a wearer/user, the illuminators 606, as well as their corresponding electrical routing may be so small as to be unnoticeable or insignificant to a user of the optical assembly 600. Additionally, any occlusion from illuminators 606 will be placed so close to the eye as to be unfocusable by the human eye and therefore assist in the illuminators 606 being not noticeable or insignificant. In some implementations, each illuminator 606 has a footprint (or size) that is less than about 200×200 microns.

As shown in FIG. 6, the illuminators 606 are disposed facing the dimming element 602 such that the illuminators 606 emit the activation light 226 directly towards the dimming element 602. In some examples, illuminators 606 may include one or more beam-shaping optics to configure the far-field beam profile of the emitted activation light 226. Such beam-shaping optics may be refractive, diffractive, or reflective in nature.

Figure 7:
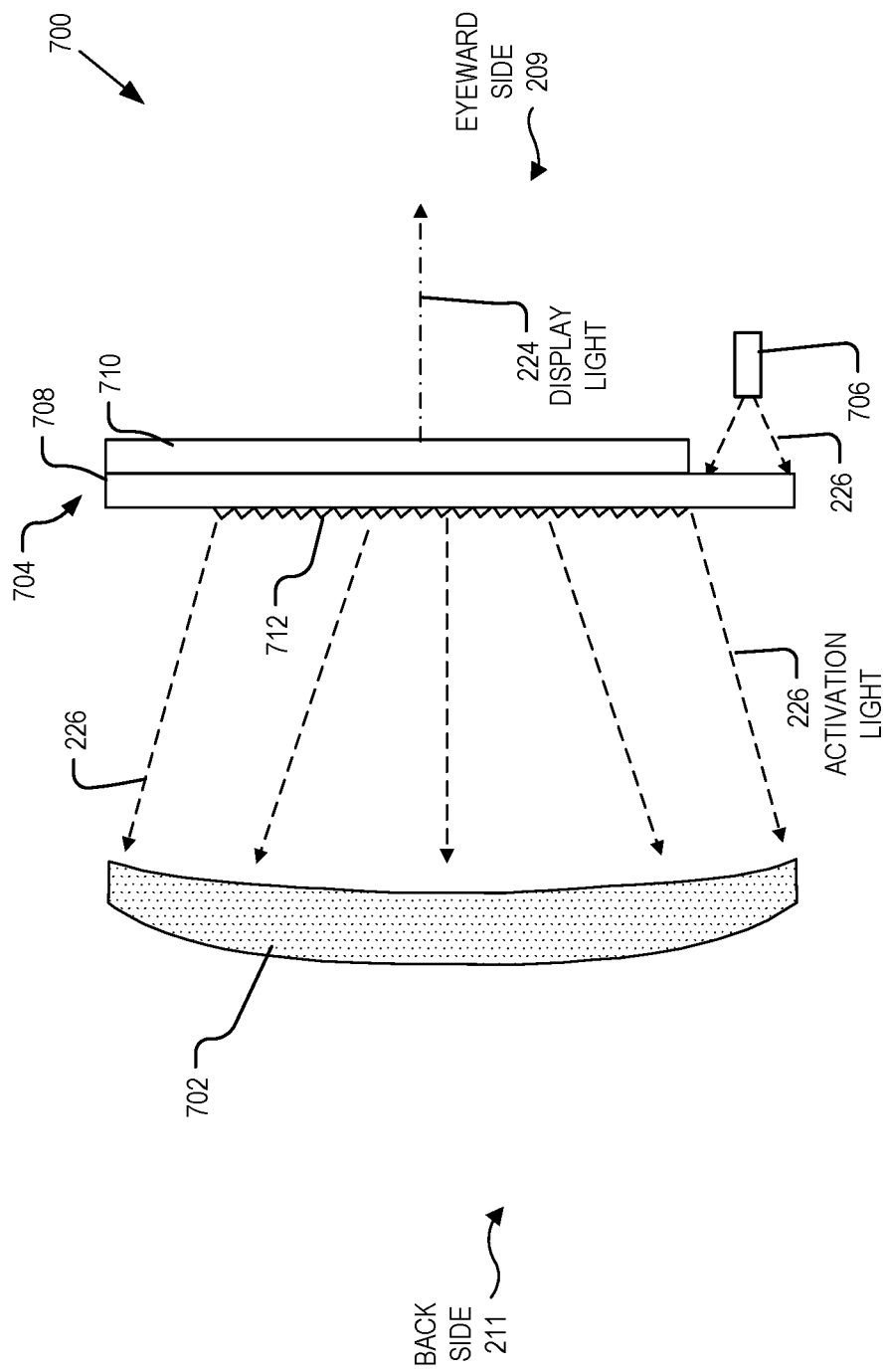
FIG. 7 illustrates an optical assembly that includes a display layer with a waveguide for directing activation light to a dimming element, in accordance with aspects of the disclosure.

FIG. 7 illustrates an optical assembly 700 that includes a display layer 704 with a waveguide 708 for directing activation light 226 to a dimming element 702, in accordance with aspects of the disclosure. Optical assembly 700 is one possible implementation of the optical assembly 206A of FIG. 2. The illustrated example of optical assembly 700 is shown as including dimming element 702 and display layer 704. Display layer 704 is shown as including a first waveguide 708, a second waveguide 710, and extraction features 712. Also shown in FIG. 7 is an illuminator 706.

In some aspects, second waveguide 710 is configured to receive and direct display light 224 to the eyeward side 209 of the optical assembly 700 for presentation to a user. In some examples, second waveguide 710 corresponds to waveguide 216 of FIG. 2. Furthermore, second waveguide 710 may be configured to absorb the wavelengths corresponding to the activation light 226 to inhibit the transmission of activation light 226 to the eyeward side 209. For example, second waveguide 710 may include silicon carbide.

The first waveguide 708 is shown as being included in the display layer 704 and as being disposed on the backside 211 of the second waveguide 710. As shown, the illuminator 506 may be in-coupled to first waveguide 708. The illuminator 506 may be a single light source of activation light 226 or it may include an array of light sources that includes multiple pixels that each emit activation light 226.

The first waveguide 708 includes a plurality of extraction features 712 that are configured to extract activation light 226 from the first waveguide 708 towards the dimming element 702. In some aspects, extraction features 712 are nanoscopic structures, such as surface relief gratings, volume Bragg gratings, polarization volume Bragg gratings, and so on. In other aspects, the extraction features 712 may be microscopic structures, such as circular, triangular, rectangular bumps, or indentations on the surface. In yet another aspect, the extraction features 712 may be implemented as a surface roughness on the order of angstroms.

In some examples, the extraction features 712 are formed over the surface of the first waveguide 708 to provide full illumination of the dimming element 702 to achieve global dimming, such as shown in FIG. 1B. In other examples, extraction features 712 are formed over a portion of the surface of the first waveguide 708 to illuminate only a region (or regions) of the dimming element 702 to achieve local dimming, such as shown in FIG. 1C.

Figure 8:
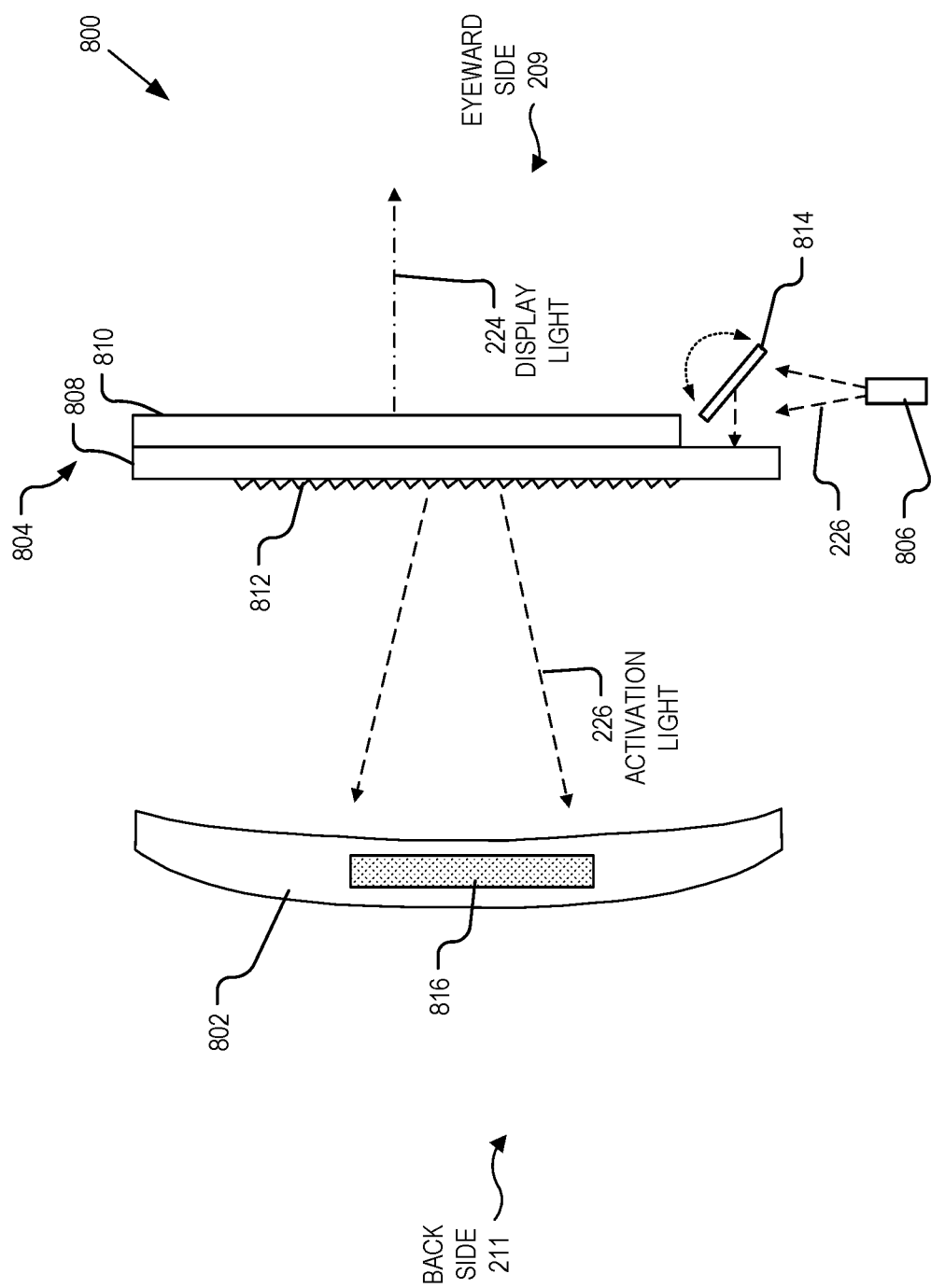
FIG. 8 illustrates another example optical assembly that includes a display layer with a waveguide for directing activation light to a dimming element, in accordance with aspects of the disclosure.

FIG. 8 illustrates an optical assembly 800 that includes a display layer 804 with a waveguide 808 for directing activation light 226 to a dimming element 802, in accordance with aspects of the disclosure. Optical assembly 800 is similar in form and structure to optical assembly 700 of FIG. 7. That is, dimming element 802, display layer 804, illuminator 806, first waveguide 808, second waveguide 810, and extraction features 812 may correspond to elements 702, 704, 706, 708, 710, and 712, respectively of FIG. 7. However, optical assembly 800 is shown as including a scanner 814 that is disposed between the illuminator 806 and the first waveguide 808. The scanner 814 may be a one-dimensional or a two-dimensional scanner that is configured to selectively steer the activation light 226 to the first waveguide 808 of the display layer 804. In some examples, the scanner 814 is configured to steer the activation light 226 into the first waveguide 808 to provide extraction of the activation light 226 (by the extraction features 812) only at specific angles. This selective light extraction at specific angles or at specific spatial locations may allow illumination of the dimming element 802 in one or more smaller regions 816 to provide local dimming, such as shown in FIG. 3C. In one aspect, the illuminator 806 provides activation light 226 that is collimated in one or both directions. Collimation of activation light 226 may be provided by a collimating lens or a cylindrical lens coupled to or included with the illuminator 806.

Figure 9:
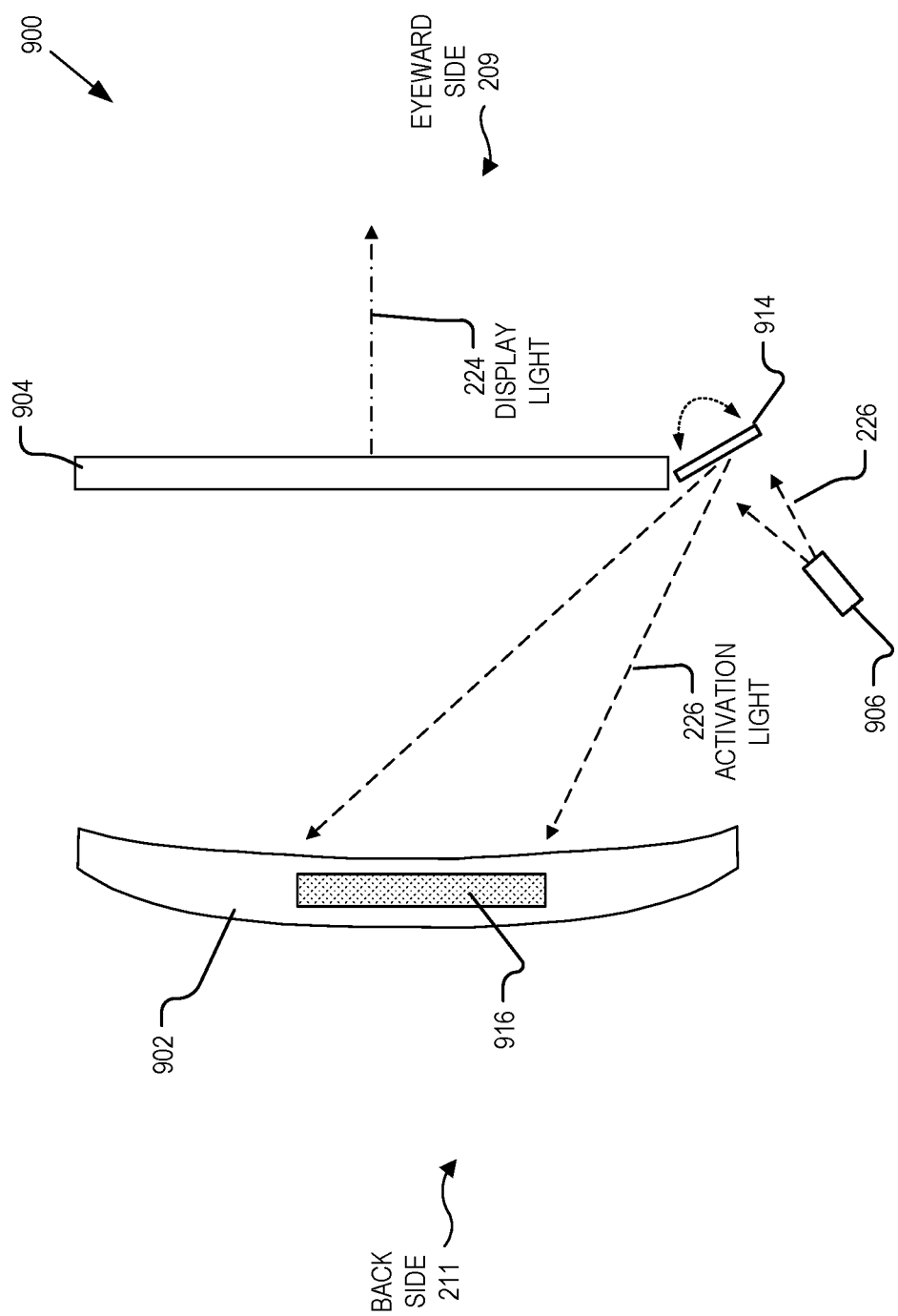
FIG. 9 illustrates an optical assembly that includes a scanner for providing local dimming of a dimming element, in accordance with aspects of the disclosure.

FIG. 9 illustrates an optical assembly 900 that includes a scanner 914 for providing local dimming of a dimming element 902, in accordance with aspects of the disclosure. Optical assembly 900 is one possible implementation of the optical assembly 206A of FIG. 2. The illustrated example of optical assembly 900 is shown as including dimming element 902, a display layer 904, an illuminator 906, and a scanner 914.

Optical assembly 900 is shown as including a scanner 914 that is disposed to receive the activation light 226 emitted by the illuminator 906 and to direct the activation light 226 towards the dimming element 902 to illuminate a region 916. The scanner 914 may be a one-dimensional or a two-dimensional scanner that is configured to selectively steer the activation light 226 to the dimming element 902. In some aspects, scanner 914 includes a mirror to reflect the activation light 226 to the dimming element 902. In another aspect, scanner 914 may include an acousto-optic modulator configured to refract or diffract the activation light 226 to the dimming element 902. In yet another aspects, scanner 914 may be a fiber optic scanner or a piezo electric scanner.

In some examples, the scanner 914 is configured to steer the activation light 226 only to specific spatial locations on a surface of the dimming element 902. This selective light extraction may allow illumination of the dimming element 902 in one or more smaller regions 916 to provide local dimming, such as shown in FIG. 3C. In one aspect, the illuminator 906 provides activation light 226 that is collimated in one or both directions. Collimation of activation light 226 may be provided by a collimating lens or a cylindrical lens coupled to or included with the illuminator 806. In addition, illuminator may include one or more of a beam shaping optic or diffractive optical element (DOE) to generate an illumination pattern of the activation light 226.

Figure 10:
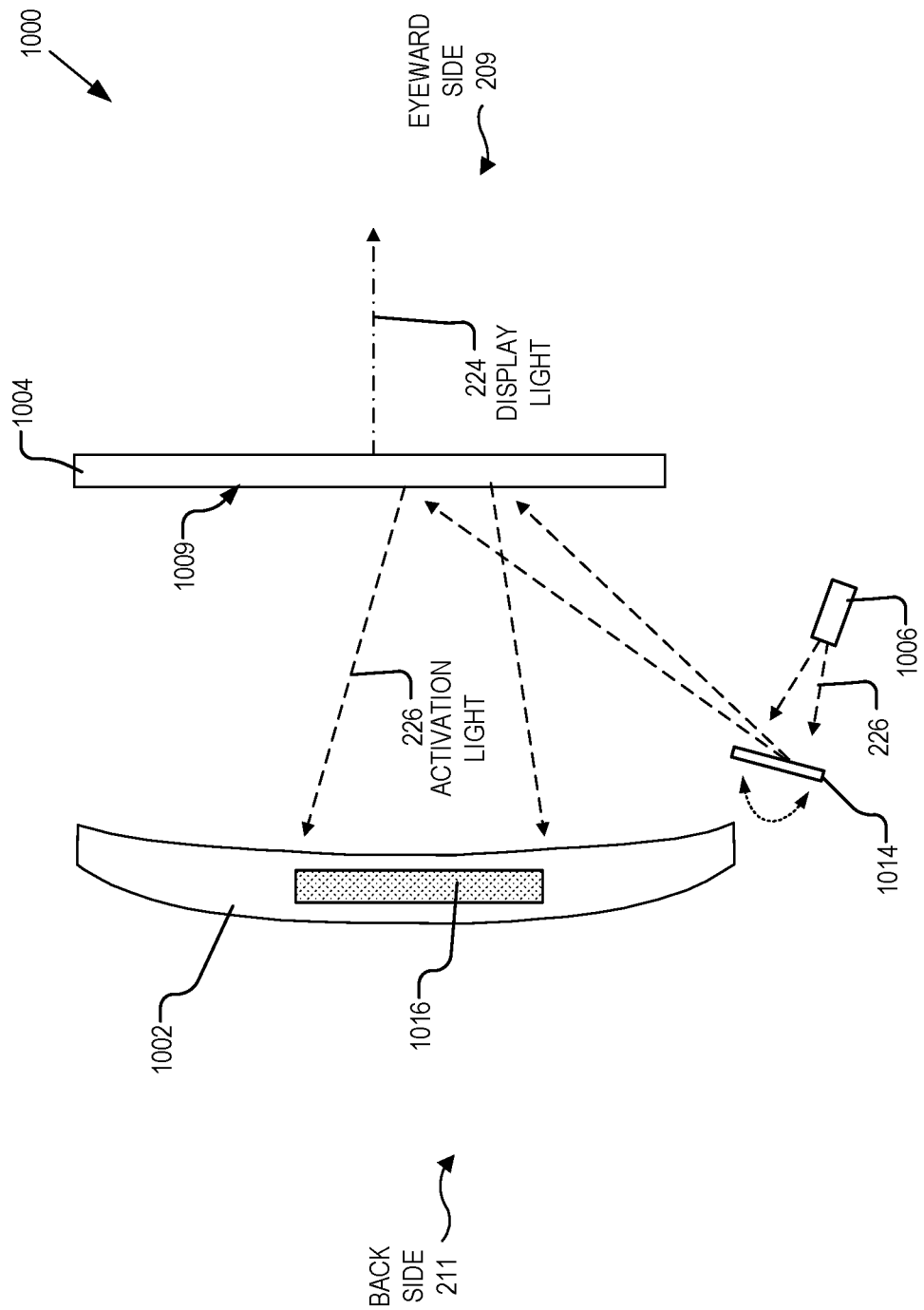
FIG. 10 illustrates an optical assembly that includes a scanner and a display layer configured to direct activation light to a dimming element by reflection, in accordance with aspects of the disclosure.

FIG. 10 illustrates an optical assembly 1000 that includes a scanner 1014 and a display layer 1004 configured to direct activation light 226 to a dimming element 1002 by reflection, in accordance with aspects of the disclosure. Optical assembly 1000 is one possible implementation of the optical assembly 206A of FIG. 2. The illustrated example of optical assembly 1000 is shown as including dimming element 1002, display layer 1004, illuminator 1006, and a scanner 1014.

Optical assembly 1000 is shown as including a scanner 1014 that is disposed to receive the activation light 226 emitted by the illuminator 1006 and to direct the activation light 226 towards the display layer 1004, which in turn reflects the activation light 226 towards the dimming element 1002 to illuminate a region 1016. The scanner 1014 may be a one-dimensional or a two-dimensional scanner that is configured to selectively steer the activation light 226 to the surface 1009 of the display layer 1004. In some aspects, scanner 1014 includes a mirror to reflect the activation light 226 to the display layer 1004. In another aspect, scanner 1014 may include an acousto-optic modulator configured to refract or diffract the activation light 226 to the display layer 1004. In yet another aspects, scanner 1014 may be a fiber optic scanner or a piezo electric scanner.

In some examples, the scanner 1014 is configured to steer the activation light 226 only to specific spatial locations on the surface 1009 of the display layer 1004. This selective light extraction may allow illumination of the dimming element 1002 in one or more smaller regions 1016 to provide local dimming, such as shown in FIG. 3C. In one aspect, the illuminator 1006 provides activation light 226 that is collimated in one or both directions. Collimation of activation light 226 may be provided by a collimating lens or a cylindrical lens coupled to or included with the illuminator 1006. In addition, illuminator 1006 may include one or more of a beam shaping optic or diffractive optical element (DOE) to generate an illumination pattern of the activation light 226.

In some examples, display layer 1004 includes a reflective layer such as reflective layer 410 of FIG. 4B or microstructures such as microstructures 412 of FIG. 4C that are formed on the surface 1009.

Figure 11:
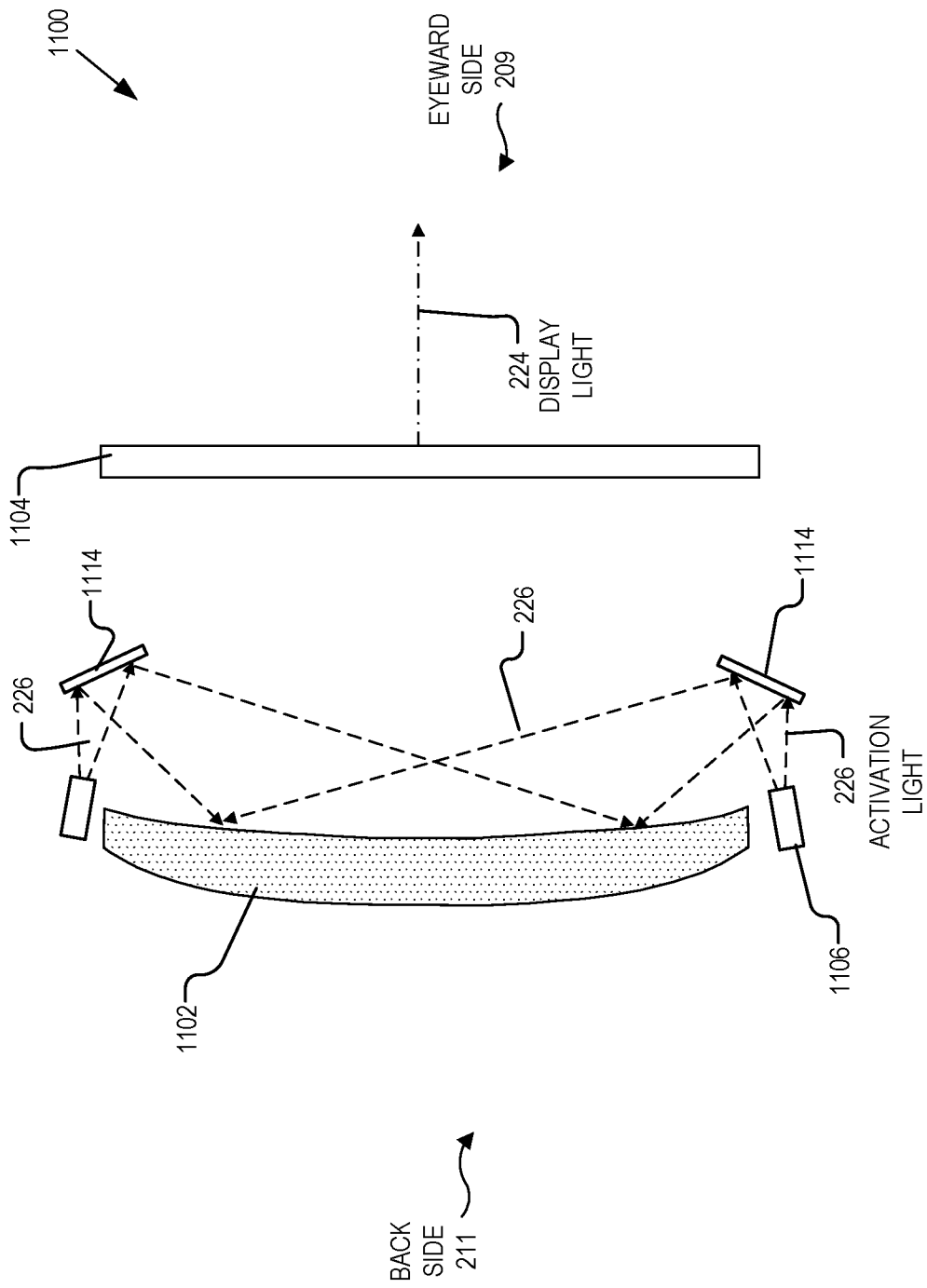
FIG. 11 illustrates an optical assembly that includes one or more diffuse reflectors configured to direct activation light to a dimming element, in accordance with aspects of the disclosure.

FIG. 11 illustrates an optical assembly 1100 that includes one or more diffuse reflectors 1114 configured to direct activation light 226 to a dimming element 1102, in accordance with aspects of the disclosure. Optical assembly 1100 is one possible implementation of the optical assembly 206A of FIG. 2. The illustrated example of optical assembly 1100 is shown as including dimming element 1102, display layer 1104, illuminators 1106, and diffuse reflectors 1114. In some examples, the illuminators 1106 may be mounted to or incorporated within a frame of a head-mounted device (e.g., frame 202 of FIG. 2). Although FIG. 11 illustrates optical assembly 1100 as including two illuminators 1106, optical assembly 1100 may include any number of illuminators 1106, including one or more.

As shown in FIG. 11, illuminator 1106 is disposed facing a corresponding diffuse reflector 1114 such that the emitted activation light 226 is received at the diffuse reflector 1114. The diffuse reflector 1114 is configured to then reflect and scatter the activation light 226 towards the dimming element 1102 to darken the photochromic material and dim the scene light 222.

The scattering of the activation light 226 towards the dimming element 1102 by way of the diffuse reflector 1114 may be utilized to generate a uniform or near uniform haze of activation light 226 to increase the uniformity of the illumination of the dimming element 1102 to trigger an evenly distributed darkening of the photochromic material.

Figure 12:
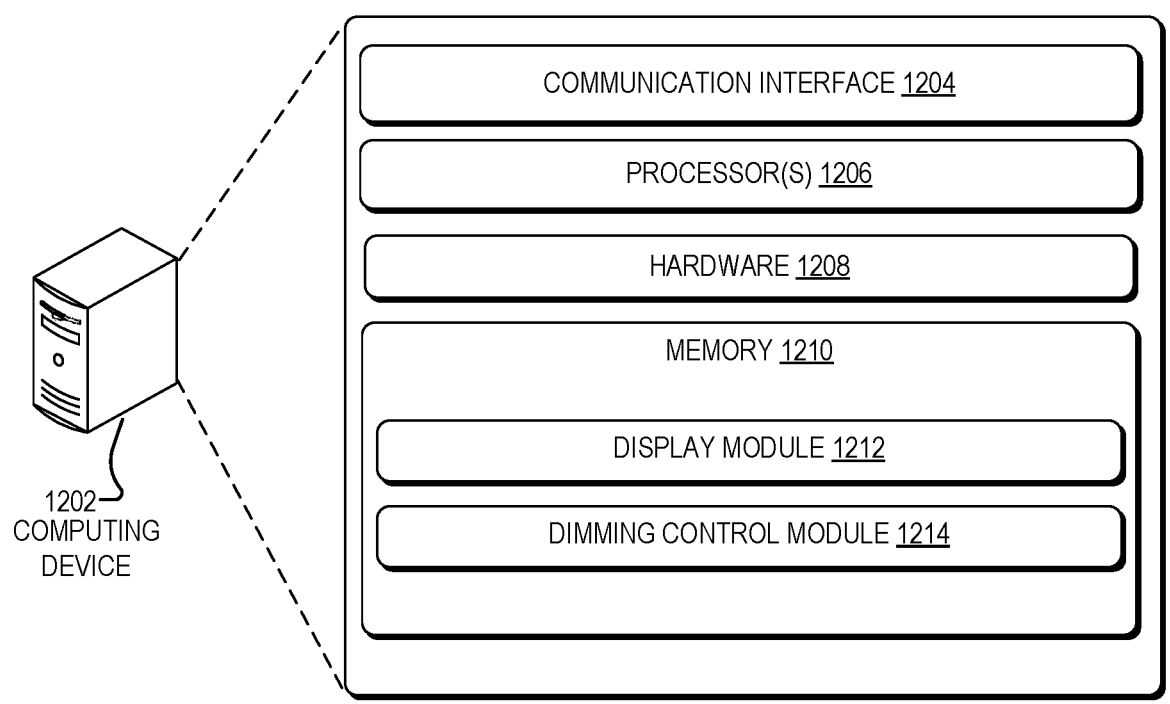
FIG. 12 illustrates an example computing device for the dynamic control of one or more illuminators, in accordance with aspects of the present disclosure.

FIG. 12 illustrates an example computing device 1202 for the dynamic control of one or more illuminators, in accordance with aspects of the present disclosure. The illustrated example of computing device 1202 is shown as including a communication interface 1204, one or more processors 1206, hardware 1208, and a memory 1210. In one example, one or more of the components illustrated in FIG. 12 may be incorporated into the frame 202 and/or temple arms 204A/204B of the head-mounted device 200 of FIG. 2. In other examples, one of more of the components illustrated in FIG. 12 may be incorporated into a remote computing device that is communicatively coupled to the head-mounted device 200 for performing one or more aspects of the dynamic control of the illuminators.

The communication interface 1204 may include wireless and/or wired communication components that enable the computing device 1202 to transmit data to and receive data from other networked devices. The hardware 1208 may include additional hardware interface, data communication, or data storage hardware. For example, the hardware interfaces may include a data output device (e.g., electronic display, audio speakers), and one or more data input devices.

The memory 1210 may be implemented using computer-readable media, such as computer storage media. In some aspects, computer-readable media may include volatile and/or non-volatile, removable and/or non-removable media implemented in any method or technology for storage of information such as computer-readable instructions, data structures, program modules, or other data. Computer-readable media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

The processors 1206 and the memory 1210 of the computing device 1202 may implement a display module 1212 and a dimming control module 1214. The display module 1212 and the dimming control module 1214 may include routines, program instructions, objects, and/or data structures that perform particular tasks or implement particular abstract data types. The memory 1210 may also include a data store (not shown) that is used by the display module 1212 and/or dimming control module 1214.

The display module 1212 may be configured to determine that the visible scene light (e.g., visible scene light 222 of FIG. 2) of the near-eye optical assembly will interfere with a visibility of a virtual graphic (e.g., virtual graphic 104 of FIG. 1) that is generated by the visible display light 224. In some implementations, the head-mounted device may include one or more light sensors that provide information about the visible scene light (e.g., brightness, contrast, color, etc.). In another implementation, the head-mounted device may include a camera that is positioned (e.g., on the temple arm 204B of FIG. 2) to obtain images of the field-of-view provided by the optical assembly. The display module 1212 may receive the images and/or data from the light sensor to determine whether the visible scene light is interfering with a visibility of the virtual graphic.

In some aspects, the display module 1212 determines the visibility of the virtual graphic based on readings obtained from the light sensors and/or by performing image processing on images of the field-of-view. This may include determining an ambient brightness and/or determining a contrast between the visible scene light and the virtual graphic. In another example, the display module 1212 may determine the visibility of the virtual graphic by comparing a color of the visible scene light in a region that corresponds to where the virtual graphic is to be displayed. If the visible scene light is too bright, the contrast between the scene light and the virtual graphic is too low, and/or if a color of the scene light is similar to that of the virtual graphic, then the display module 1212 then determines that the visible scene light will indeed interfere with the visibility of the virtual graphic.

In response the determination by the display module 1212 that the visible scene light will interfere with the visibility of the virtual graphic, the dimming control module 1214 may then activate the darkening of one or more regions of the dimming element of the near-eye optical assembly to dim and/or occlude the visible scene light. For example, with reference to head-mounted device 200 of FIG. 2, the dimming control module 1214 may enable one or more illuminators to emit the activation light 226 which is then directed to dimming element 212 by the display layer 210 to activate the darkening of the photochromic material. As discussed above, the darkening of the dimming element 212 may dim the visible scene light 222 to increase the visibility of the virtual graphic generated by display light 224.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An optical assembly, comprising:
an eyeward side and a backside, wherein the optical assembly is configured to receive visible scene light at the backside of the optical assembly and to direct the visible scene light on an optical path toward the eyeward side;
a dimming element disposed on the optical path between the eyeward side and the backside, wherein the dimming element includes a photochromic material that is configured to darken in response to exposure to a range of light wavelengths; and
a display layer disposed on the optical path between the eyeward side of the optical assembly and the dimming element, wherein the display layer is configured to direct visible display light toward the eyeward side and to reflect activation light towards the dimming element, wherein the activation light is within the range of light wavelengths to activate a darkening of the photochromic material to dim the visible scene light.

2. The optical assembly of claim 1, further comprising:
one or more illuminators disposed between the eyeward side and the backside of the optical assembly, wherein the one or more illuminators are configured to selectively emit the activation light, and wherein a surface of the display layer is configured to receive the activation light and to reflect the activation light towards the dimming element.

3. The optical assembly of claim 2, wherein the display layer comprises a reflective layer disposed on the surface of the display layer, wherein the reflective layer is transmissive to the visible scene light and reflective to the activation light.

4. The optical assembly of claim 2, wherein the display layer is configured to absorb the activation light to inhibit transmission of the activation light to the eyeward side of the optical assembly.

5. The optical assembly of claim 4, wherein the display layer comprises silicon carbide.

6. The optical assembly of claim 2, wherein the surface of the display layer comprises a plurality of microstructures configured to scatter the activation light towards the dimming element.

7. The optical assembly of claim 2, wherein the one or more illuminators are disposed facing the display layer to emit the activation light towards the surface of the display layer.

8. The optical assembly of claim 7, wherein the one or more illuminators are disposed on the surface of the dimming element and within a field of view of the dimming element.

9. The optical assembly of claim 2, further comprising:
a scanner disposed between the eyeward side and the backside of the optical assembly to receive the activation light emitted by the one or more illuminators, wherein the scanner is configured to selectively steer the activation light towards the display layer and to activate darkening of a region of the dimming element.

10. The optical assembly of claim 1, further comprising:
one or more illuminators disposed on a surface of the display layer and within a field of view of the display layer, wherein the one or more illuminators are configured to selectively emit the activation light directly towards the dimming element.

11. The optical assembly of claim 1, wherein the display layer further comprises:
an illuminator configured to selectively emit the activation light; and
a waveguide optically coupled to the illuminator to receive the activation light and to direct the activation light towards the dimming element.

12. The optical assembly of claim 11, further comprising:
a scanner disposed between the illuminator and the waveguide to receive the activation light emitted by the illuminator, wherein the scanner is configured to selectively steer the activation light towards the display layer and to activate darkening of a region of the dimming element.

13. The optical assembly of claim 1, wherein the activation light comprises non-visible light, ultraviolet light, infrared light, or violet light.

14. A head-mounted device, comprising:
a frame; and
an optical assembly secured within the frame, wherein the optical assembly is configured to receive visible scene light at a backside of the optical assembly and to direct the visible scene light on an optical path toward an eyeward side of the optical assembly, wherein the optical assembly includes:

a dimming element disposed on the optical path between the eyeward side and the backside, wherein the dimming element includes a photochromic material that is configured to darken in response to exposure to a range of light wavelengths; and a display layer disposed on the optical path between the eyeward side of the optical assembly and the dimming element, wherein the display layer is configured to direct visible display light toward the eyeward side and to reflect activation light towards the dimming element, wherein the activation light is within the range of light wavelengths to activate a darkening of the photochromic material to dim the visible scene light.

15. The head-mounted device of claim 14, wherein the dimming element comprises a lens, and wherein the photochromic material is included in a coating on at least one optical surface of the lens.

16. The head-mounted device of claim 14, wherein the dimming element comprises a lens, and wherein the photochromic material is included in a dye embedded within the lens.

17. The head-mounted device of claim 14, further comprising:

one or more illuminators disposed between the eyeward side and the backside of the optical assembly within a field of view of the optical assembly, wherein the one or more illuminators are configured to selectively emit the activation light.

18. The head-mounted device of claim 17, wherein the one or more illuminators comprise a vertical cavity surface emitting laser (VCSEL).

19. An optical assembly, comprising:

a dimming element that includes:

a lens; and a photochromic material, wherein the photochromic material is included in a coating on an optical surface of the lens or in a dye embedded within the lens, wherein the photochromic material is configured to darken in response to exposure to a range of light wavelengths; and a display layer disposed on an optical path between an eyeward side of the optical assembly and the dimming element, wherein the display layer is configured to direct visible display light toward the eyeward side and to reflect activation light towards the dimming element, wherein the activation light is within the range of light wavelengths to activate a darkening of the photochromic material to dim visible scene light.

20. The optical assembly of claim 19, wherein the activation light comprises non-visible light, ultraviolet light, infrared light, or violet light.

* * * * *